Aug. 17, 1965
W. H. LIBAW ETAL
3,201,763
TRANSDUCING SYSTEM
Filed Sept. 6, 1960
9 Sheets-Sheet 3
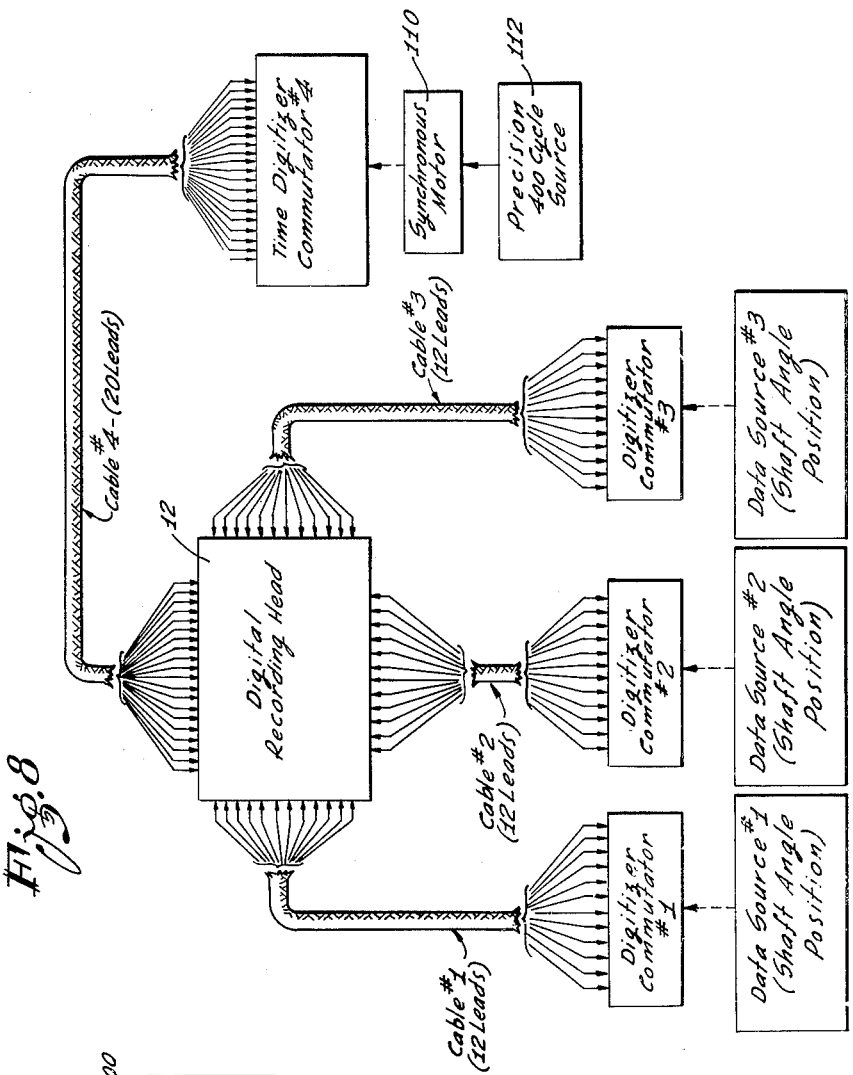
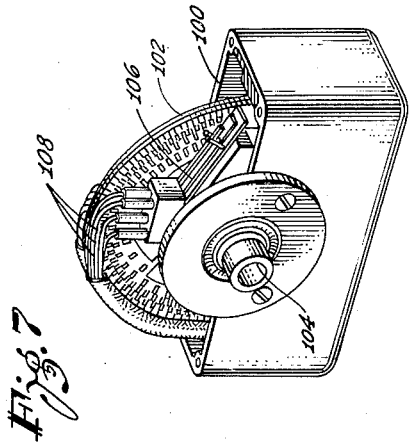
INVENTORS:
William H. Libaw
Iver A. Sonderby
James Jenkins, Jr.
By Smyth, Roston
& Pavitt Attorneys.

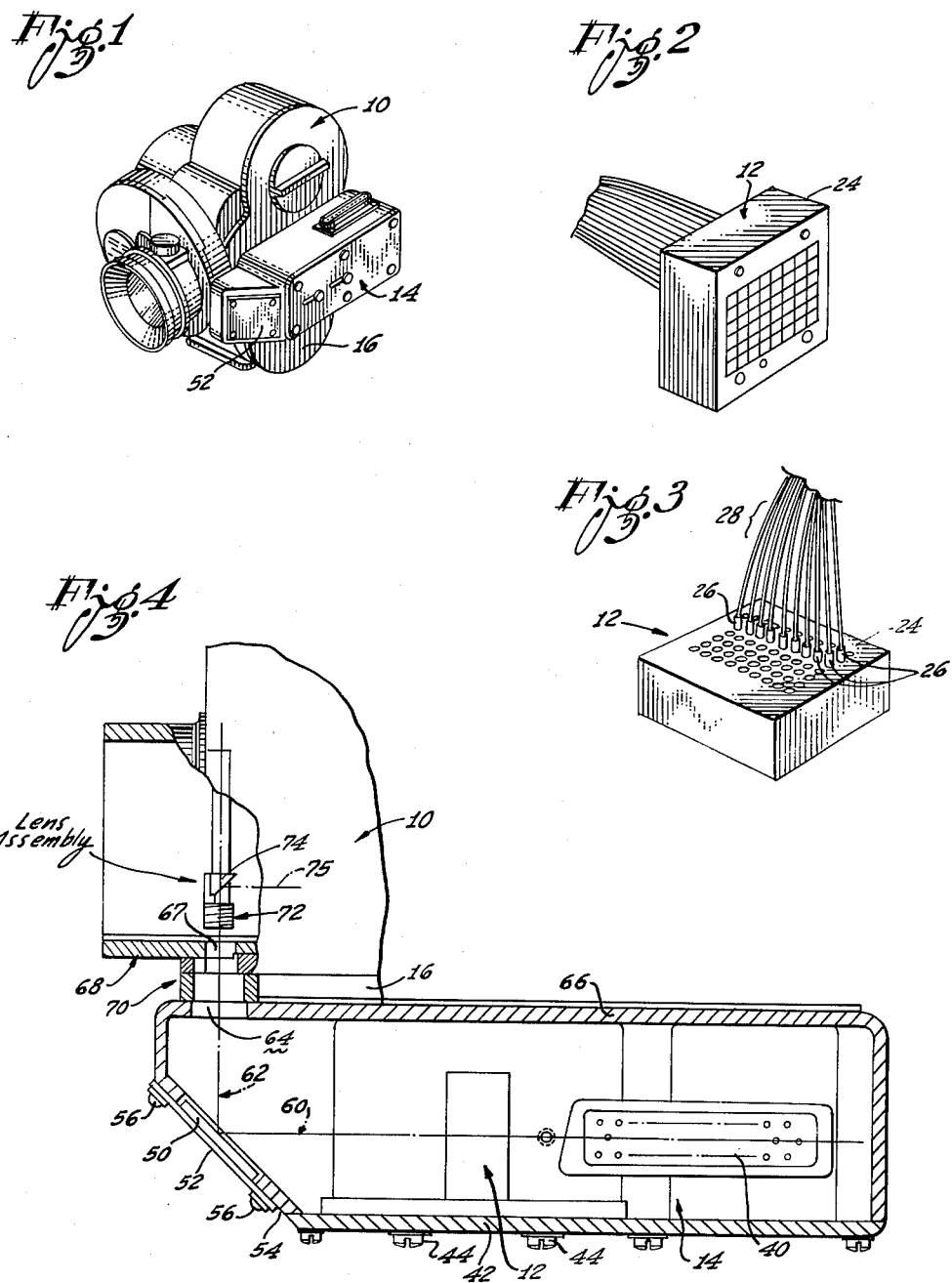

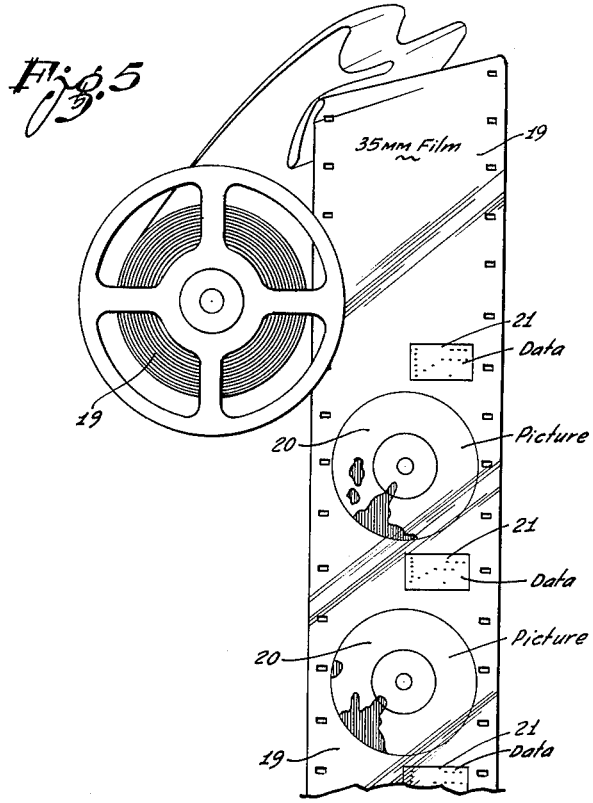

INVENTORS:
William H. Libaw
Iver A. Sonderby
James Jenkins, Jr.

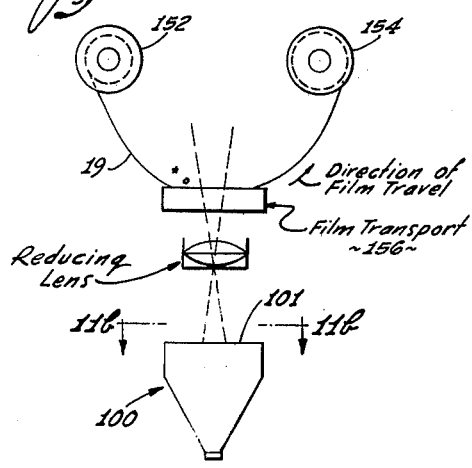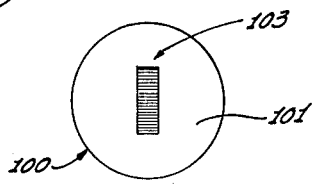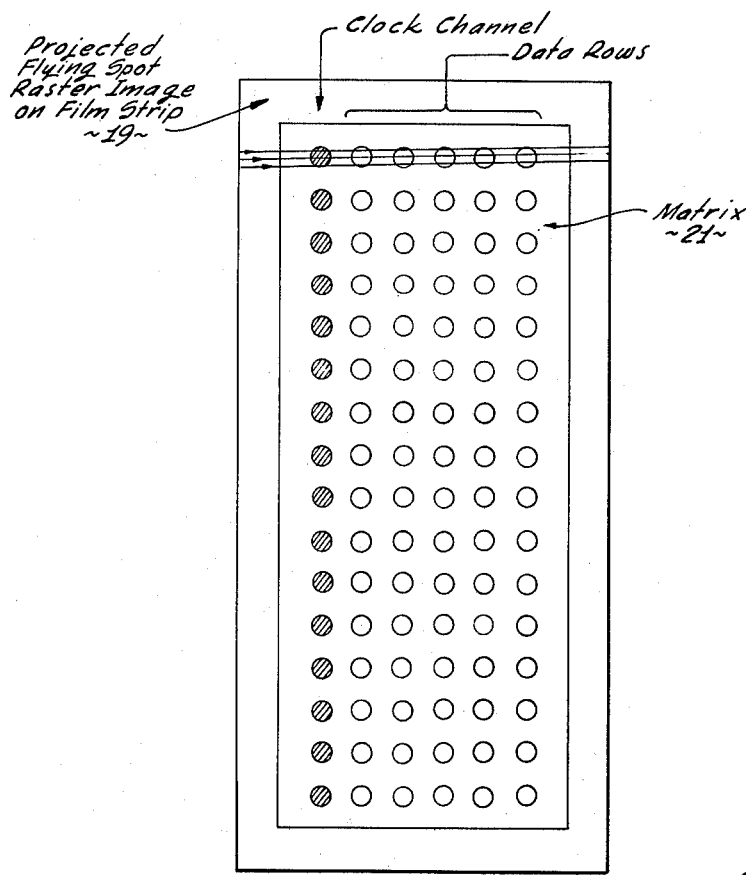

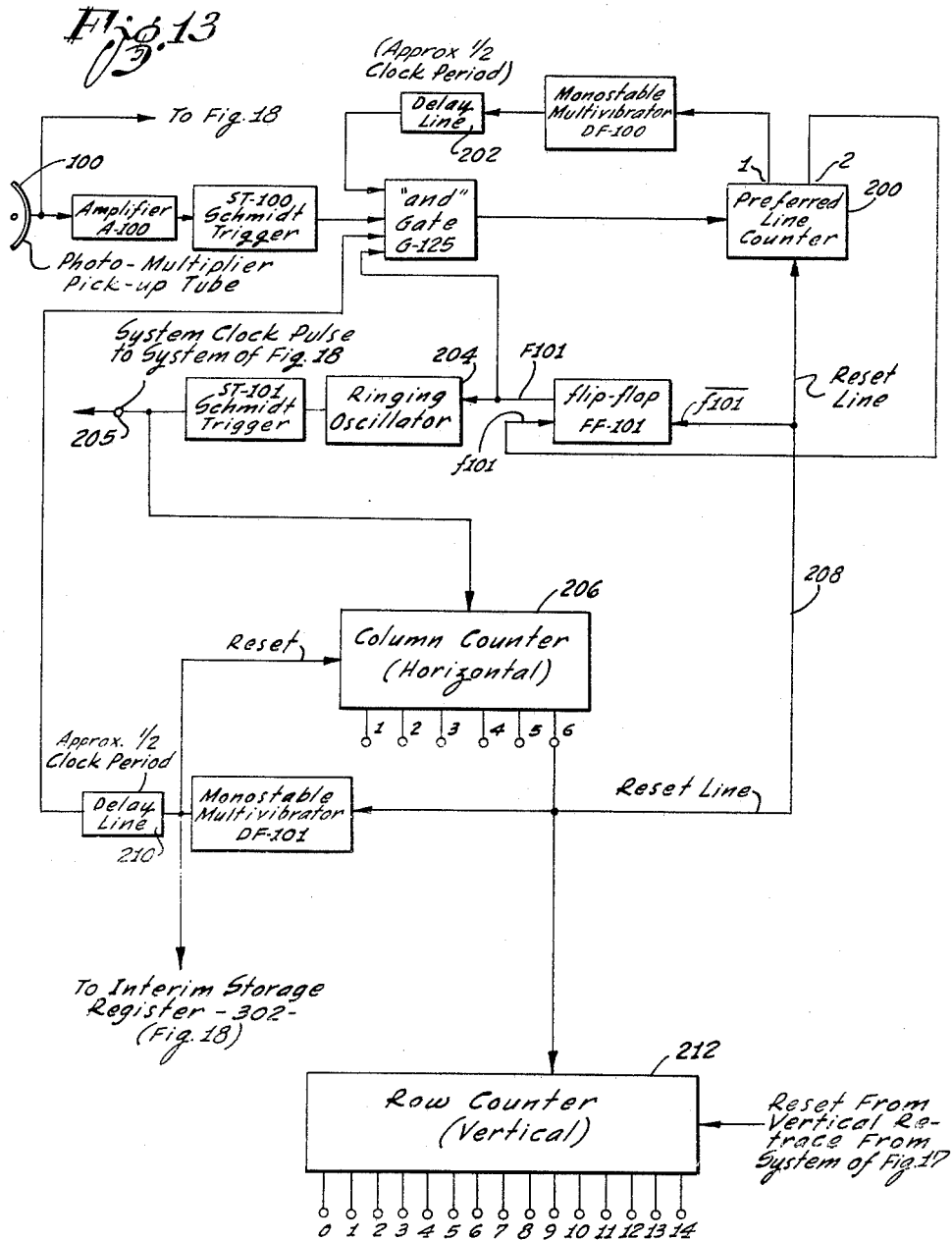

Aug. 17, 1965  W. H. LIBAW ETAL  3,201,763
TRANSDUCING SYSTEM
Filed Sept. 6, 1960  9 Sheets-Sheet 7
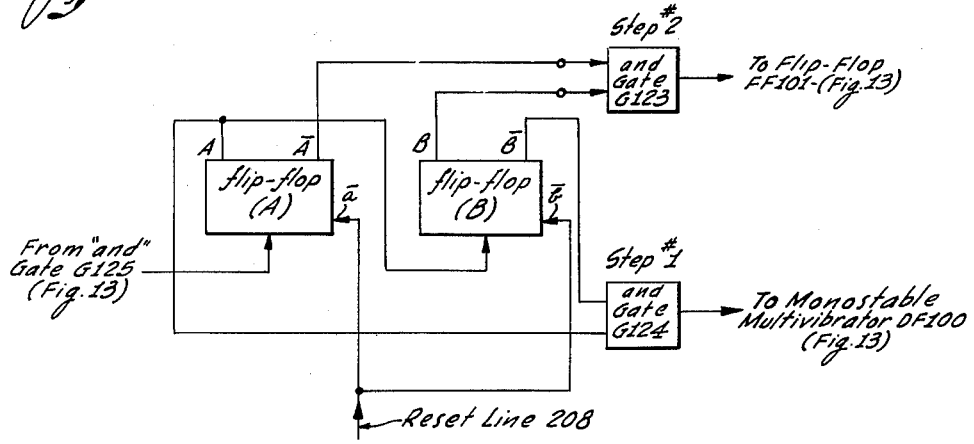
Fig. 14 (Preferred Line Counter-200)
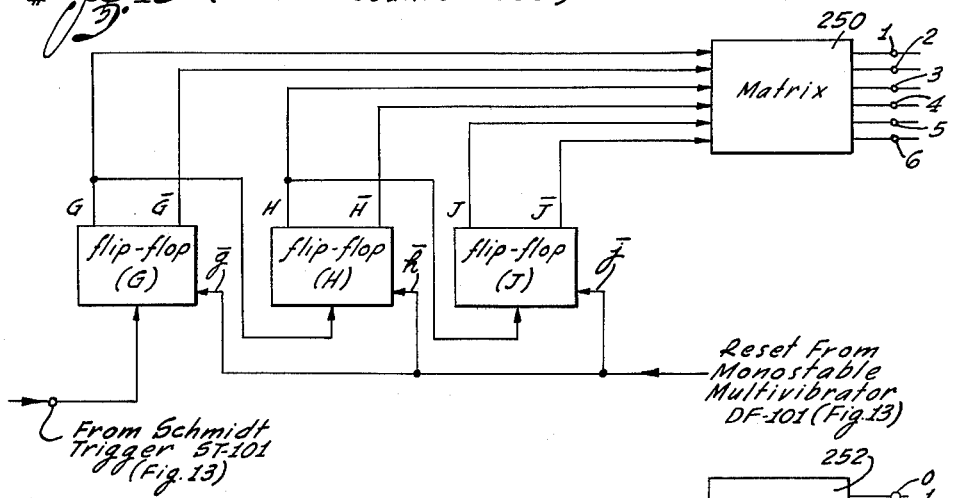
Fig. 15 (Column Counter -206-)
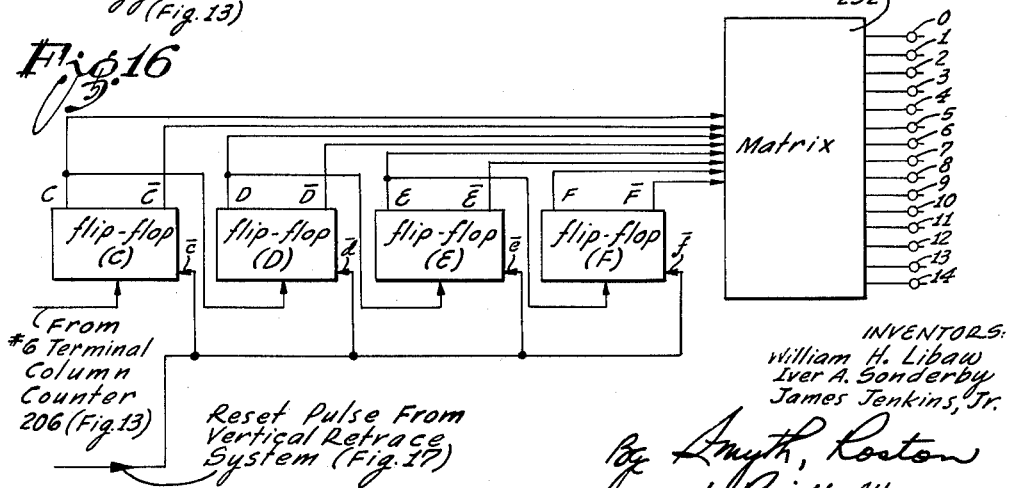
Fig. 16
INVENTORS:
William H. Libaw
Iver A. Sonderby
James Jenkins, Jr.
By Smyth, Roston
& Pavitt Attorneys,

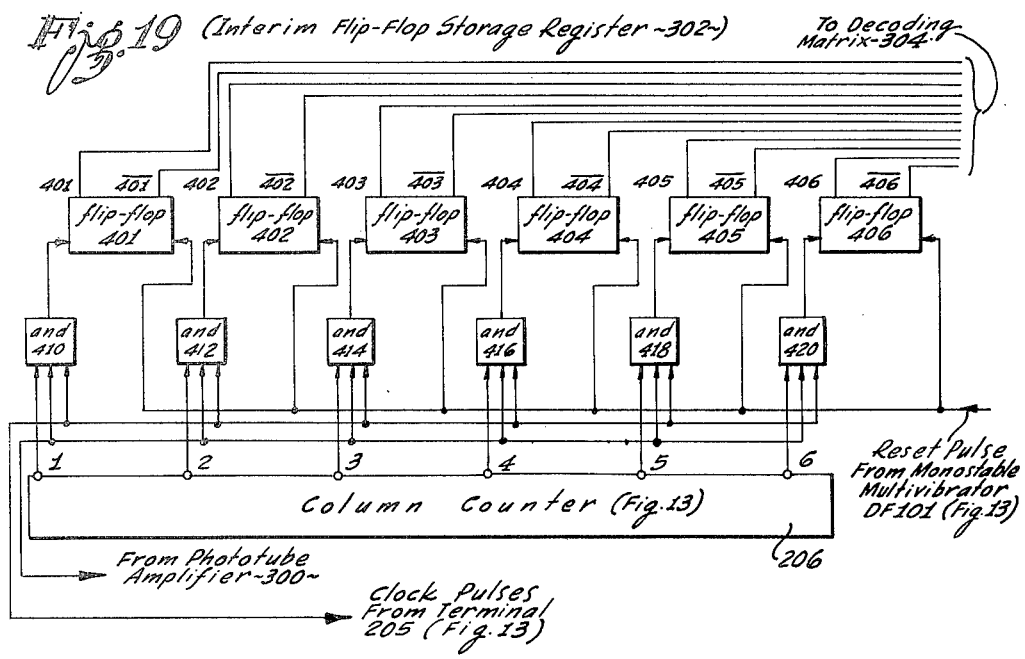

United States Patent Office 3,201,763
Patented Aug. 17, 1965

3,201,763
TRANSDUCING SYSTEM
William H. Libaw, Los Angeles, Iver A. Sonderby, Manhattan Beach, and James Jenkins, Jr., Woodland Hills, Calif., assignors to The Magnavox Company, Torrance, Calif., a corporation of California
Filed Sept. 6, 1960, Ser. No. 54,315
3 Claims. (Cl. 340—173)

This invention relates to a sight data system which is capable of recording binary coded information along with pictorial information to which the binary coded information relates, and which also is capable of subsequently reading and decoding the recorded binary coded information.

In practicing the invention, a pictorial record of a subject under certain environmental conditions is produced on a suitable medium. This medium appropriately may be a motion picture film strip. The subject itself may, for example, be a piece of equipment, and the pictorial record may represent the equipment operating under actual working conditions. Alternately, the subject may represent the position of a target with respect to a gunsight. It will become evident as the description proceeds that a wide range of subjects may form the pictorial record in the system of the invention.

Further in accordance with the invention, digital data pertaining to the pictorial record is also recorded on the medium and adjacent the successive film frames on which the pictorial record is recorded. This digital data is represented on the medium, for example, in the form of a pattern of dots comprising a matrix, the matrix being repeated from frame to frame on the medium.

The dot pattern referred to in the preceding paragraph may represent a plurality of different items of data related to the subject which is pictorially recorded on the film strip. Such data may, for example, be represented by shaft rotations in suitable known mechanical computating equipment. Appropriate digitizing commutator discs, as will be explained, are mechanically coupled to respective ones of the shafts to convert the readings represented by the different angular positions of the respective shafts into corresponding digital signals. These digital signals are then introduced to a digital recording head, similar to that described in U.S. Letters Patent 3,069,682 (issued on a copending application). This enables corresponding matrices of dot patterns to be recorded on the medium which, as indicated above, may conveniently be a motion picture film strip.

As noted, a suitable and improved digital recording head for the present purposes is disclosed and claimed in copending said Patent 3,069,682. This digital recording head, as described in detail in the copending application, and as will be described briefly in the present application, includes a plurality of sub-miniature electric lamp assemblies which are supported to form an array, and which may be individually energized. The output signals from the digitizing commutator discs referred to above are applied to the individual lamp assemblies in the digital recording head, and the lamp assemblies are individually energized in patterns corresponding to the output signals from the digitizing discs.

The digital recording head of the copending application referred to above is positioned so that the selectively illuminated lamp assemblies, which are mounted in the head, may be used to produce the successive dot matrices on the film strip in the recording apparatus and adjacent the film frames which bear the pictorial record with which the data represented by the illuminations of the lamp assembly is correlated.

A feature of the improved sight data recording system of the invention is the provision of a non-ambiguous recording mechanism and system in which analog data, as represented by the angular positions of the different shafts in the mechanical computer, is converted to coded decimal digital form without the occurrence of serious reading ambiguities by the digitizing discs. The system of the invention is so conceived and constructed that analog quantities can be converted to decimal digits for recording on the film strip, and this is carried out in such a manner that any reading ambiguities are reduced to the least significant decimal digit.

Another feature of the invention is the provision of an improved clock generator in the sight data system of the invention. The improved clock generator is constructed to provide a record of elapsed time in a digital code which may be represented by the controlled illuminations of a selected group of lamps in the digital recording head, and to achieve such a control without the production of serious reading ambiguities. The clock record, therefore, may be recorded on the film strip by the digital recording head in conjunction with the other data pertinent to the pictorial representations on the strip.

The system of the present invention is also capable of sensing the data recorded on the film strip. This sensing, as will be described, may be carried out by means of a flying spot scanner. The sensing equipment includes suitable registers and matrices which permit the coded data to be read from the film strip and decoded. The decoded data may then be used to control any known type of printer, or similar output device, such as a Flexowriter.

An important object of the present invention, therefore, is to produce an improved system which provides a convenient means for establishing permanent records of a test subject. These records, as described above, include pictorial recordings of the subject itself under a particular set of conditions, and also include a digital matrix representing certain parameters embodied in the set of conditions to which the test subject is subjected. The system also provides a convenient and rapid means for reading and decoding the coded information on the film record.

One application for the system of the invention, for example, is in the evaluation of a gunsight system. The recorded information can then be used to evaluate the performance of the operator or of the gunsight system itself. In particular, the system of the present invention can be used to determine whether errors in firing, or failure to hit a target, were due to errors in the actual use of the gunsight system or due to malfunction in the system itself. In this aspect, the system of the invention also enables records to be made which can be used to determine optimum methods of using the gunsight system.

In the particular application referred to in the preceding paragraph, photographs of the actual target in relation to the gunsight reticle may be made and recorded on a film strip in a motion picture camera. In addition to the pictorial recordings, and correlated with those recordings, the system of the present invention may be used to record a digitized record on the film strip pertaining to certain parameters necessary in evaluating the performance of the gunsight system. These parameters may all be represented by shaft rotations in a mechanical computer, as noted above. The resulting angular positions of the respective shafts are converted to digital signals by respective digitizing discs, and in accordance with a particular code as will be described. In a specific instance, the angular positions of three such shafts were recorded to within .065°; a time record was provided in hours, minutes, seconds, and tenths of seconds, and other ancillary information also was recorded.

In the drawings:

FIGURE 1 is an illustration of a typical motion picture camera having a digital recording head mounted on it, the digital recording head and its associated components being mounted on a side panel of the camera housing, and the camera being modified in a simple manner to incorporate a lens assembly for projecting images from the face of the digital recording head to successive spaced positions on the film strip in the motion picture camera;

FIGURE 2 is a front perspective view of a digital recording head, the illustrated head containing a plurality of individually energized miniature electric lamp assemblies, the lamp assemblies being positioned in the digital recording head in a plurality of rows and columns to constitute an array;

FIGURE 3 is a rear perspective view of the digital recording head of FIGURE 2, this latter view illustrating particularly the manner in which electric leads are brought into contact with the individual lamp assemblies in the digital recording head and the manner in which the lamp assemblies are supported in the head;

FIGURE 4 is a top sectional view of the digital recording head assembly referred to above and mounted on a motion picture camera, this view particularly illustrating the manner in which the digital recording head is mounted in a housing and in which an optical path is provided from the front face of the recording head to the motion picture film strip in the camera;

FIGURE 5 is a schematic illustration of a typical film strip, the illustrated film strip including pictorial radar images in successive film frames and also including respective digital data matrices adjacent the successive film frames;

FIGURE 6 is a diagrammatic illustration of the front face of the digital recording head, the particular head including ninety individual lamp assemblies which are arranged in a series of six rows with fifteen assemblies to each row, the front faces of the individual lamp assemblies being represented by rectangles in the diagrammatic view;

FIGURE 7 is a perspective view of the mechanical details of a digitizing commutator disc assembly, the illustrated assembly being suitable to be mechanically coupled to a shaft so as to convert the analog quantity represented by the angular position of the shaft into appropriately coded digital signals;

Figure 9:
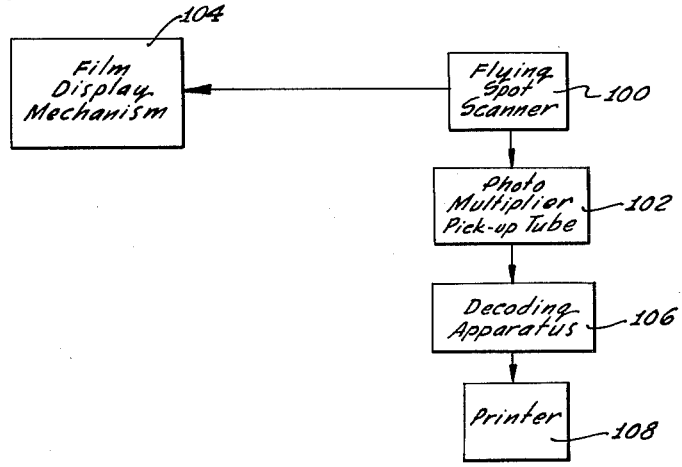
Figure 10:
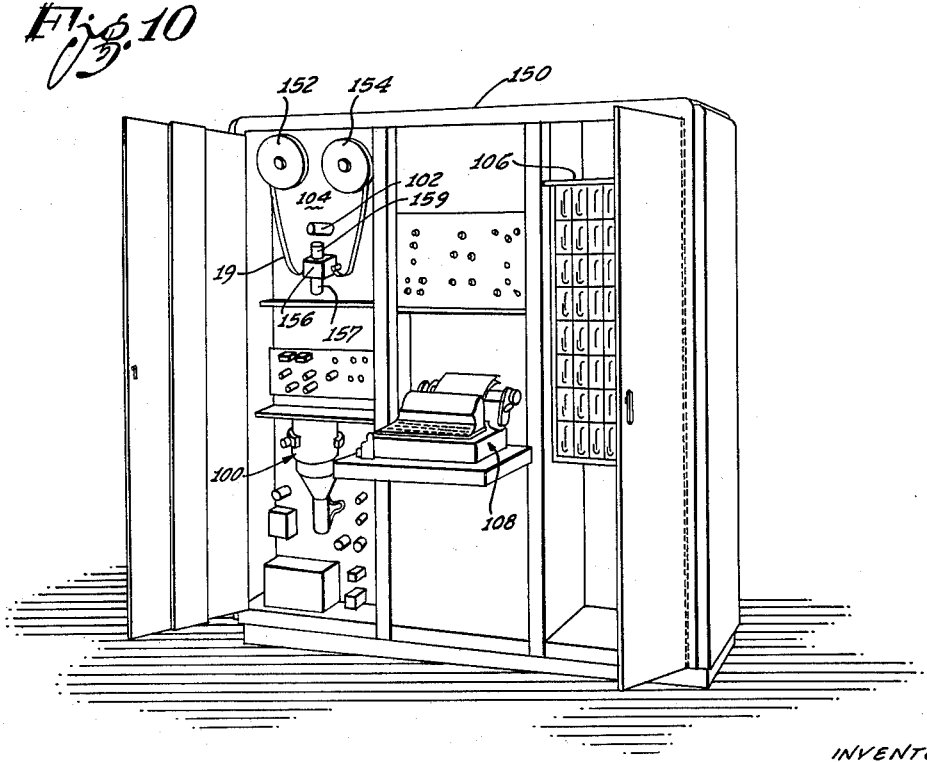
Figure 17:
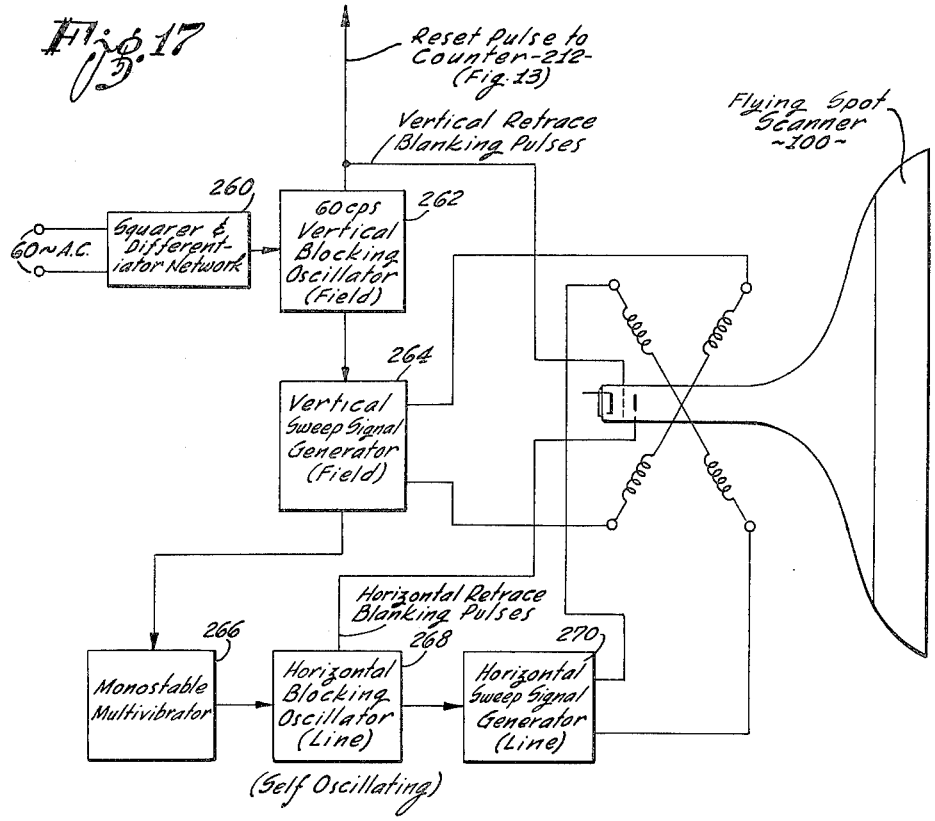
Figure 18:
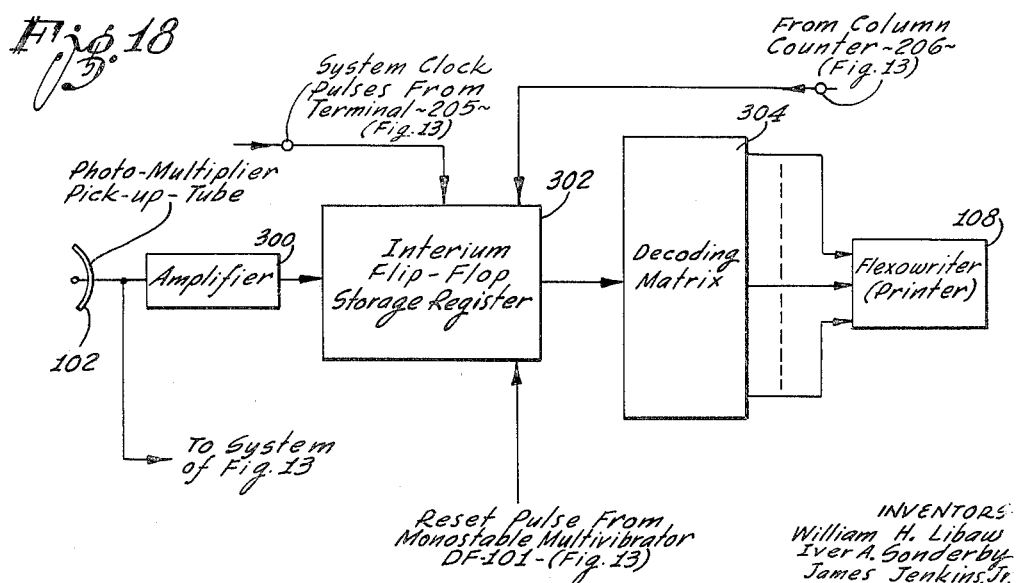

FIGURE 8 is a block diagram of a suitable recording system, whereby different data items are converted into coded digital signals and used to energize selectively the electric lamp assemblies in the digital recording head, the system of FIGURE 8 also including a clocking system whereby elapsed time may be represented by the selective energizing of a particular group of lamp assemblies in the recording head;

FIGURE 9 is a block diagram illustrating schematically an appropriate read-out system for processing the data on the film strip, the illustrated system including a flying spot scanner for sensing the information represented by the successive dot matrices;

FIGURE 10 is a perspective view of an appropriate housing and mechanical mounting assembly for the read-out system of FIGURE 9;

FIGURE 11A is a diagrammatic representation of the read-out system of FIGURE 9 and showing in plan the flying spot scanner and the optical components for directing the beam from that scanner along an optical path to the film strip;

FIGURE 11B is a view substantially on the line 11B—11B of FIGURE 11A and showing the viewing screen of the flying spot scanner and the raster formed on that screen;

FIGURE 12 is an enlarged schematic representation of one of the dot matrices data areas on the film strip and also showing the projection of the flying spot raster image on that area and the path traced out by the flying spot beam;

FIGURE 13 is a block logic diagram of the control circuitry included in the read-out system which permits the digital information stored on the dot matrices data areas on the film strip to be converted into electrical signals;

FIGURES 14, 15 and 16 are block representations of different counters which are included in the read-out system logic circuitry of FIGURE 13;

FIGURE 17 is a schematic view showing, partly in block form, the flying spot scanner and its associated control stages and components;

FIGURE 18 is a block diagram of a decoding section of the read-out system, which system responds to the electric signals produced by the logic circuitry of FIGURE 13 to produce appropriate controls for an output device such as a Flexowriter;

FIGURE 19 is a logic block diagram of an interim flip-flop storage register which is included in the decoding section of FIGURE 18; and FIGURE 20 is a table illustrating a typical control code for an output device such as the Flexowriter mentioned above.

As described in Patent 3,069,682, the camera 10 illustrated in FIGURE 1 is a commercially available camera. The illustrated camera is manufactured by the Traid Corporation of 17136 Ventura Boulevard, Encino, California. The particular camera is designated by the Traid Corporation as their "35 mm. Traid 75A Fototracker."

A digital recording head, constructed in accordance with the teaching of Patent 3,069,682 is indicated generally as 12 in FIGURES 2 and 3, and the head is mounted in a housing 14 in FIGURE 1. The housing 14, in turn, is mounted on a door 16 of the motion picture camera housing.

As will be described, the digital recording head 12 supports a plurality of individually energized miniature electric lamp assemblies, the assemblies being arranged as an array in rows and columns. In the embodiment to be described, 90 lamps are used in a 6 by 15 array. The housing 14 is mounted on the camera 16 in a manner such that the individual illuminations from the array of lamps in the digital recording head 12, supported in the housing 14, may be relayed into the camera and directed onto the film strip in the camera. The elements which form the optical path from the face of the digital recording head 12 into the camera will be described in more detail subsequently.

FIGURE 5 illustrates a film strip 19 which may be used in the motion picture camera 10. The film strip 19 includes a plurality of film frames 20 which contain pictoral representations of a particular radar display in the illustrated assembly. The film strip 19 also includes a plurality of digital matrices 21 which are disposed adjacent respective ones of the film frames 20. Each of these matrices is a reproduction of the illumination pattern of the array of lamps in the digital recording head 12. The matrix image appears, in each instance, adjacent a corresponding film frame, and it represents in a coded decimal digital code, information relative to the pictorially represented information in the accompanying film frame.

As described in Patent 3,069,682, the digital recording head 12 (FIGURES 2 and 3) includes an apertured block 24. A plurality of holes are drilled in the block, and these holes extend through the block from its rear face to its front face. A plurality of electrically energized incandescent sub-miniature lamp assemblies 26 are supported in respective ones of the holes in the block 24. Each of the sub-miniature incandescent lamp assemblies 26 illuminates, for example, an area of 10 mils on a side, with the lamps being separated by 10 mil spaces. The lamp assemblies 26 may be of the type, for example, which operate at one volt.

The sub-miniature lamp assemblies 26 each include an extremely small electric lamp which is supported in a metallic tube. The metallic tube forms a contact to one side of the lamp element. A lead, such as the leads 28, extends to each of the lamps within its corresponding metallic tube, and these leads form respective connections to the other side of the individual lamp elements. The lamps may be sealed in their corresponding tubes, by a light diffusing resinous material. The tube diameter may, for example, be .065 inch. The sub-miniature lamp assemblies 26 may be of the type presently being manufactured by the American Scystoscope Makers Incorporated.

In the recording system to be described, a common ground connection is made to the metallic tubes of the lamp assemblies 26, and connections from the various brushes of a plurality of digitizing commutator discs are made to respective ones of the leads 28. This enables selective groups of lamps 26 to be selectively energized in accordance with the digital signals produced by the various commutator discs.

The sectional view of FIGURE 4 illustrates the housing 14, and its internal elements, on an enlarged scale with respect to FIGURE 1. This view shows in detail the manner in which the digital recording head 12 is supported in the housing, and by which an optical path is provided from the front face of the digital recording head to the camera 10. As illustrated in FIGURE 4, a terminal block 40 is supported in the housing, and the various leads 28 to the individual lamps 26 may be connected to this terminal block to receive the external connections from the various digitizing commutator discs.

The digital recording head 12 is mounted in an upright position within the housing 14. The recording head is supported at one end by a cover plate 42 which, in turn, is secured to the housing 14 by means of screws, such as the screws 44. This permits the digital recording head to be removed from the housing 14 for lamp replacement, merely by releasing the screws 44 and by removing the cover plate 42 and the attached recording head 12 from the housing 14.

The digital recording head 12 is supported within the housing 14 so that its front face 46 is directed towards the forward end of the housing. A mirror 50 is supported in the forward end of the housing on a cover plate 52. The cover plate 52 is supported on an inclined portion 54 of the end wall of the housing 14. The cover plate 52 is secured to the inclined portion 54 of the end wall by a plurality of screws 56. The mirror 50 is positioned in the optical path which extends from the front face 46 of the digital recording head 12 to the film strip in the motion picture camera 10. As illustrated in FIGURE 4, the optical axis from the front face 46 of the digital recording head 12 to the mirror 50 is represented by a line 60. The mirror 50 serves to deflect the optical axis 60 through 90° and along a line 62 and through an aperture 64 in the side wall 66 of the housing.

As mentioned above, the housing 14 is supported on the door 16 of the camera 10, and it is so supported that its aperture 64 is disposed in axially alignment with an aperture 67 at the side of the lens assembly 68 of the camera 10. A light seal 70 is cemented to the housing 14 to prevent external light from entering the aperture 66.

A small lens asesmbly 72 is positioned in the camera lens assembly 68 adjacent the aperture 67. The latter lens assembly includes a prism which serves to displace the optical axis 62 angularly through 90° so as to project light images from that optical axis along an optical axis 75 to the film strip in the motion picture camera 10. This enables images of the illuminated sub-miniature electric lamps in the digital recording head 12 to be directed into the camera 10 to be recorded in successive film frames of the film strip in the camera, as described above. As noted, the motion picture camera 10 may be directed at a radar display to provide the pictorial images of FIGURE 5. This display, for example, may be a plan position indicator display illustrating the position of a vehicle with respect to various objects. Other relevant information concerning the flight characteristics of the vehicle and of its relation to the target are represented by the digital matrices 21, this information being recorded in a manner to be explained.

In a constructed embodiment of the invention, and as mentioned above, the digital recording head 12 of FIGURES 2 and 3 contains 90 light sources formed by individual ones of the subminiature lamp assemblies 26. These lamp assemblies have individual diameters of .065 inch, as mentioned above, and the 90 lamps are assembled in a digital recording head which measures .75 cubic inch in volume. As shown in FIGURE 6, the lamps in the digital recording head are arranged in a 6 x 15 array. The distance between the coded recording spots or bits is approximately .020 inch, and the spots themselves are of the order of 10 mils in diameter.

As illustrated in FIGURE 6, the illuminations from the sub-miniature lamp assemblies 26 in the digital recording head 12 result in a matrix. The matrix illustrated in FIGURE 6 comprises 6 horizontal rows designated 1H–6H, with each row including 15 bits designated 1V–15V. Each bit, for example, represents a binary "1" when its corresponding lamp is energized and represents a binary "0" when its corresponding lamp is de-energized.

In the illustration of FIGURE 6, the 15 bits in the top row (1H) of the matrix are established at binary "1" at all times during recording, by the continuous energizing of their corresponding lamps 26. This top row (1H) constitutes the clock row, and its function will be described in conjunction with the description of the read-out of the digital data. The remaining bits of the matrix of FIGURE 6 are used to record the coded decimal equivalents of the shaft angle measures which, as mentioned above, represents the different items of data, the time record, and other information related to the pictorial record. For these latter processes, different groups of lamps and the lamps of the different groups are selectively energized in accordance with the coded decimal digits representing the various items.

For most purposes, and as noted above, the data to be recorded usually occurs in the form of analog quantities, and these quantities are converted in a known type of computer into separate shaft angular positions. The angular shaft positions are then converted into coded decimal digits which are recorded in the matrix of FIGURE 6, as described above. In this manner, each item of data may be represented, for example, by 3 or 4 decimal digits, and each of the decimal digits is represented by the selected energizing of a combination of four of the lamps of the matrix. This coded combination for each decimal digit is chosen to obviate reading ambiguities in the digitizing commutator discs which are used to transfer each analog quantity, represented by a particular angular shaft position, into signals representative of the decimal digits corresponding to that analog quantity.

A typical digitizer commutator disc for performing the functions described above is illustrated in FIGURE 7. The illustrated disc is manufactured by the Datex Division of G. M. Giannini and Company, Incorporated, of 1307 South Myrtle Avenue, Monrovia, California. The illustrated commutator disc includes a housing 100, the top portion of which has been removed. A disc-like member 102 is rotatably mounted in the housing 100 on a shaft 104. The shaft 104 is intended to be coupled to a corresponding one of the shafts whose angular position is to be converted into coded decimal digits.

The digitizer disc assembly of FIGURE 7 includes a plurality of contact brushes 106 which are supported in the housing. These contact brushes are positioned to engage respective ones of a plurality of annular tracks formed on the disc 102.

A plurality of conductive and non-conductive segments are disposed around each of the annular tracks on the disc 102, and the brushes associated with the respective tracks are caused to engage alternately the conductive and non-conductive segments in those tracks. The brushes 106 are connected by suitable leads 108 to the terminal board 40 of FIGURE 4 so that corresponding ones of the lamp assemblies 26 may be selectively energized. Because the construction and concept of digitizing commutator discs, such as the assembly of FIGURE 7, are well known to the art, a detailed explanation of the assembly will not be included. It should be stated, however, and as will be described in some detail subsequently, the digitizer disc assembly of FIGURE 7 serves to convert the angular position of the shaft to which it is coupled into coded decimal digits in accordance with a particular code. The particular code is chosen so that any reading ambiguities in the brushes 106 with respect to their respective annular tracks is reduced to the least significant decimal digit.

To reduce the reading ambiguities in the digitizer discs to the least significant decimal digit, a particular code is used to insure that recordings made during a reading change in the digitizer will be recorded with a minimum error. For example, if a change from 199 mils to 200 mils is in process at the time of recording, the only reading that can be recorded is either 199 or 200 and not 299 or 100. The code to be described is conceived so that reading changes follow similar patterns thereby to reduce reading errors to the least significant digit, as will be described. The code selected for a constructed embodiment of the invention is as follows:

| Decimal Numbers | Coded Decimal Numbers | Matrix Code |
|---|---|---|
| 000 | 000 | 0000.0000.0000 |
| 001 | 001 | 0000.0000.0001 |
| 002 | 002 | 0000.0000.0011 |
| 003 | 003 | 0000.0000.0010 |
| 004 | 004 | 0000.0000.0110 |
| 005 | 005 | 0000.0000.1110 |
| 006 | 006 | 0000.0000.1010 |
| 007 | 007 | 0000.0000.1011 |
| 008 | 008 | 0000.0000.1001 |
| 009 | 009 | 0000.0000.1000 |
| 010 | 019 | 0000.0001.1000 |
| 011 | 018 | 0000.0001.1001 |
| 012 | 017 | 0000.0001.1011 |
| 013 | 016 | 0000.0001.1010 |
| 014 | 015 | 0000.0001.1110 |
| 015 | 014 | 0000.0001.0110 |
| 016 | 013 | 0000.0001.0010 |
| 017 | 012 | 0000.0001.0011 |
| 018 | 011 | 0000.0001.0001 |
| 019 | 010 | 0000.0001.0000 |
| 020 | 020 | 0000.0011.0000 |
| 021 | 021 | 0000.0011.0001 |
| 022 | 022 | 0000.0011.0011 |
| 023 | 023 | 0000.0011.0010 |
| 024 | 024 | 0000.0011.0110 |
| 025 | 025 | 0000.0011.1110 |
| 026 | 026 | 0000.0011.1010 |
| 027 | 027 | 0000.0011.1011 |
| 028 | 028 | 0000.0011.1001 |
| 029 | 029 | 0000.0011.1000 |
| 030 | 039 | 0000.0010.1000 |
| 031 | 038 | 0000.0010.1001 |
| 032 | 037 | 0000.0010.1011 |
| 033 | 036 | 0000.0010.1010 |
| 034 | 035 | 0000.0010.1110 |
| 035 | 034 | 0000.0010.0110 |
| 036 | 033 | 0000.0010.0010 |
| 037 | 032 | 0000.0010.0011 |
| 038 | 031 | 0000.0010.0001 |
| 039 | 030 | 0000.0010.0000 |
| 040 | 040 | 0000.0110.0000 |
| 041 | 041 | 0000.0110.0001 |
| 042 | 042 | 0000.0110.0011 |
| 043 | 043 | 0000.0110.0010 |
| 044 | 044 | 0000.0110.0110 |
| 045 | 045 | 0000.0110.1110 |
| 046 | 046 | 0000.0110.1010 |
| 047 | 047 | 0000.0110.1011 |
| 048 | 048 | 0000.0110.1001 |
| 049 | 049 | 0000.0110.1000 |
| 050 | 059 | 0000.1110.1000 |
| 051 | 058 | 0000.1110.1001 |
| 052 | 057 | 0000.1110.1011 |
| 053 | 056 | 0000.1110.1010 |
| 054 | 055 | 0000.1110.1110 |
| 055 | 054 | 0000.1110.0110 |
| 056 | 053 | 0000.1110.0010 |
| 057 | 052 | 0000.1110.0011 |
| 058 | 051 | 0000.1110.0001 |
| 059 | 050 | 0000.1110.0000 |
| 060 | 060 | 0000.1110.0000 |
| . | . | . |
| . | . | . |

| Decimal Numbers | Coded Decimal Numbers | Matrix Code |
|---|---|---|
| 089 | 089 | 0000.1001.1000 |
| 090 | 099 | 0000.1000.1000 |
| 091 | 098 | 0000.1000.1001 |
| . | . | . |
| 099 | 090 | 0000.1000.0000 |
| 100 | 190 | 0001.1000.0000 |
| 101 | 191 | 0001.10000.0001 |
| . | . | . |
| 109 | 199 | 0001.1000.10000 |
| 110 | 189 | 001.1001.1000 |
| 111 | 188 | 001.1001.1001 |
| . | . | . |

Therefore, for each data item, for example, the lamps of a group of 12 lamps in the matrix of FIGURE 6 are selectively energized in accordance with the code of the right hand column in the above table. The encoding of the table obeys the following rule; look first at the most significant digit of the decimal number and observe whether it is even or odd. If it is even, write the next digit unaltered; but if it is odd, write the 9's complement of the next digit. Repeat this operation for the adjacent digit and so on.

A time record is also kept in the particular constructed embodiment of the invention to be described. This time record, as noted above, uses a digital clock and records elapsed time from a particular reference in hours, minutes and seconds. The time record can be extended down to tenths of seconds, if so desired. The time record is also represented by coded digits in the matrix of FIGURE 6, but on a "59" basis rather than on a decimal basis. The code used is also cyclic to obviate reading ambiguities in the digitizer disc generating the code, and it follows the following table:

| Time | | | Time Code | | | Decimal Code | | |
|---|---|---|---|---|---|---|---|---|
| Hrs. | Mins. | Secs. | Hrs. | Mins. | Secs. | Hrs. | Mins. | Secs. |
| 0 | 00 | 00 | 0 | 00 | 00 | 0 | 00 | 00 |
| 0 | 00 | 01 | 0 | 00 | 01 | 0 | 00 | 01 |
| 0 | 00 | 02 | 0 | 00 | 02 | 0 | 00 | 02 |
| 0 | 00 | 03 | 0 | 00 | 03 | 0 | 00 | 03 |
| 0 | 00 | 04 | 0 | 00 | 04 | 0 | 00 | 04 |
| 0 | 00 | 05 | 0 | 00 | 05 | 0 | 00 | 05 |
| 0 | 00 | 06 | 0 | 00 | 06 | 0 | 00 | 06 |
| 0 | 00 | 07 | 0 | 00 | 07 | 0 | 00 | 07 |
| 0 | 00 | 08 | 0 | 00 | 08 | 0 | 00 | 08 |
| 0 | 00 | 09 | 0 | 00 | 09 | 0 | 00 | 09 |
| 0 | 00 | 10 | 0 | 00 | 10 | 0 | 00 | 19 |
| 0 | 00 | 11 | 0 | 00 | 11 | 0 | 00 | 18 |
| 0 | 00 | 12 | 0 | 00 | 12 | 0 | 00 | 17 |
| 0 | 00 | 13 | 0 | 00 | 13 | 0 | 00 | 16 |
| 0 | 00 | 14 | 0 | 00 | 14 | 0 | 00 | 15 |
| 0 | 00 | 15 | 0 | 00 | 15 | 0 | 00 | 14 |
| 0 | 00 | 16 | 0 | 00 | 16 | 0 | 00 | 13 |
| 0 | 00 | 17 | 0 | 00 | 17 | 0 | 00 | 12 |
| 0 | 00 | 18 | 0 | 00 | 18 | 0 | 00 | 11 |
| 0 | 00 | 19 | 0 | 00 | 19 | 0 | 00 | 10 |
| 0 | 00 | 20 | 0 | 00 | 20 | 0 | 00 | 20 |
| 0 | 00 | 21 | 0 | 00 | 21 | 0 | 00 | 21 |
| 0 | 00 | 22 | 0 | 00 | 22 | 0 | 00 | 22 |
| 0 | 00 | 23 | 0 | 00 | 23 | 0 | 00 | 23 |
| 0 | 00 | 24 | 0 | 00 | 24 | 0 | 00 | 24 |
| 0 | 00 | 25 | 0 | 00 | 25 | 0 | 00 | 25 |
| . | . | . | . | . | . | . | . | . |
| 0 | 00 | 59 | 0 | 00 | 59 | 0 | 00 | 50 |
| 0 | 01 | 00 | 0 | 01 | 59 | 0 | 01 | 50 |
| 0 | 01 | 01 | 0 | 01 | 58 | 0 | 01 | 51 |
| 0 | 01 | 02 | 0 | 01 | 57 | 0 | 01 | 52 |
| . | . | . | . | . | . | . | . | . |
| 0 | 01 | 59 | 0 | 01 | 00 | 0 | 01 | 00 |
| 0 | 02 | 01 | 0 | 02 | 00 | 0 | 02 | 00 |
| 0 | 02 | 01 | 0 | 02 | 01 | 0 | 02 | 01 |
| . | . | . | . | . | . | . | . | . |

Then each of the decimal digits in the columns entitled "Decimal Code" above, can be transformed into the binary code described above, and as set out in the following table:

| Decimal Digit | Matrix Code |
| --- | --- |
| 0 | 0000 |
| 1 | 0001 |
| 2 | 0011 |
| 3 | 0010 |
| 4 | 0110 |
| 5 | 1110 |
| 6 | 1010 |
| 7 | 1011 |
| 8 | 1001 |
| 9 | 1000 |

The time code of the above table is similar to the previous cyclic decimal code with two exceptions: (1) the "units" that are operated upon are not a succession of decimal digits, but are a succession of hours, minutes and seconds; (2) the complementation is on 59 rather than 9.

A group of 20 of the lamps in the matrix of FIGURE 6 is set aside for the time record, and these lamps are individually energized in accordance with elapsed time and in accordance with the digits in the matrix code columns of the time table set out above.

The block diagram of FIGURE 8, as noted above, represents in schematic form a typical digital recording system for use with the digital recording head 12. The illustrated system is capable of recording three different items of data. The first data item is derived from a data source No. 1, the second item is derived from a data source No. 2, and the third item is derived from a data source No. 3. Each of this sources, for example, may be included in a mechanical type of computer, and the different data readings may be represented by corresponding angular positions of different shafts in the computer. The shafts are mechanically coupled to respective ones of a group of three digitizer commutator assemblies, these being designated as digitizer commutator assembly No. 1, No. 2 and No. 3. Appropriate cables, each incorporating 12 leads for the recordation of groups of three decimal digits, connect respective ones of the digitizer commutator discs to the digital recording head 12. These connections are made in the manner described above, so that the individual lamps in the digital recording head 12 may be selectively energized by the signals produced by the different digitizer commutator discs. Each of the digitizer commutator disc assemblies may be constructed in the manner illustrated in FIGURE 7. The conductive segments of the discs in the various digitizer assemblies may be established, for example, at a positive voltage. Then, whenever the various brushes in the digitizer assemblies contact conductive segments, the corresponding lamps 26 are energized.

The system of FIGURE 8 is shown as including a time digitizer commutator No. 4. The digitizer commutators 1–3 are constructed to produce digital output signals following the decimal code described above. The time digitizer commutator No. 4, on the other hand, is constructed to generate the time decimal code, also described above. As mentioned, both these codes are of the cyclic type, and are designed to avoid reading ambiguities in the different digitizers.

The time digitizer commutator No. 4 is driven by a synchronous motor 110 which, in turn, is driven by a source of energy 112. The source 112 is a precision frequency source, and the drive signal for the synchronous motor 110 has its frequency precisely controlled at, for example, 400 cycles. This causes the synchronous motor 110, and the digitizer commutator No. 4 which is coupled to the motor, to be driven at a precisely controlled and pre-established angular speed. As the time digitizer commutator No. 4 is driven at the particular speed, the resulting signals generated by it in accordance with the time code table set out above, cause the lamps in the digital recording head 12 controlled by it to be selectively energized in accordance with a precise measurement of the elapsed time from a particular reference.

The precision frequency source 112, and the synchronous motor 110, may be of any known commercially available types. For that reason, it is believed that a more detailed explanation of these components is not necessary for a full disclosure of the present invention.

The lamps used in the digital recording head 12 in the constructed embodiment of the invention are rated at 1.5 volts and 90 milliamperes. The digitizer disc assemblies are capable of handling this load directly so that no additional amplifiers or isolating networks are required to drive the recording head. The requirements for a constructed embodiment of the invention, as far as recording speed is concerned, is as follows: the shutter of the motion picture camera 10 is to be opened from 1 to 4 milliseconds. The film strip may be ASA50 to ASA200. Tests indicated that 1.1 volts was sufficient to record on the slowest film at the 1 millisecond shutter opening. This voltage was then used in the lamps rather than the 1.5 normal rated voltage, so as to increase lamp life. The camera 10 is designed for two recording speeds, 16 frames per second and 32 frames per second.

The rate of recording (using the camera 10 and the 90-bit digital recording head 12) is 2740 bits per second. The fastest rate that can be recorded with lamps, with bias voltage applied, would be greater than 330 frames per second. This is the record time only and does not include the transport time between frames. Using the particular digital recording head with 90 light sources, this corresponds to recording approximately 30,000 bits per second. This information rate can be increased by utilizing a digital recording head having a greater number of lamp assemblies mounted in it.

The number of bits per second which can be recorded are limited by the time required to bring the filament of each lamp up to temperature and back down to the "off" condition. The particular sub-miniature lamp assemblies used in the constructed embodiment of the invention are capable of being turned on in approximately 3 milliseconds. That is, three milliseconds are required from the time the voltage is applied to the filament of a particular lamp until there is sufficient light to record on the film. Two milliseconds are required to cool the filament down to the point where it will no longer record on the film.

In the constructed embodiment of the invention, the lamps are continually energized during the recording period. The rate that information changes, that is, the three angular shaft positions being measured, is such that during the 1–4 millisecond exposure time, information will change at most by only one bit. The code used for this information is such that a movement change is reflected only as a change in the least significant position, as described above. The record exhibited by the film strip of FIGURE 5 contains, therefore, the following information: a picture of the (1) event, test subject, or other matter under consideration; (2) a measurement of the position of three shaft angles which represent three different items of data connected with the subject matter of the picture; (3) a time record in hours, minutes and seconds from the time the particular test started; (4) further indications of other events, for example, of the "on-off" type may also be displayed by the matrix.

An appropriate system for reading the digital information from the matrices 21 recorded on the film strip (FIGURE 5), is illustrated in FIGURE 9. The reading system of FIGURE 9 includes, for example, a film reader which, in turn, includes a flying spot scanner 100 and a photo-multiplier tube 102. This tube may be of the type presently designated 1P21. The film strip is transported through a suitable film display mechanism 104 so that the data area at matrices 21 may be successively scanned by the flying spot scanner 100.

The reading system also includes decoding apparatus 106 which is coupled to the photo-multiplier tube 102, and which includes a matrix for decoding the signals produced by that tube, as will be described. The decoding apparatus may be coupled to an appropriate printer 108, which is controlled by signals from the decoding apparatus to provide a decoded printed record of the data recorded in the dot matrices 21 of the film strip. This printer may be, for example, of any known type such as a Flexowriter.

The mechanical components of the film reader equipment are shown in some detail in FIGURE 10. The equipment includes a cabinet 150 which houses the different elements and circuitry which are used to read the data recorded on the film in successive ones of the matrices 21. In FIGURE 10, the film strip 19 is supported by usual reels 152 and 154 and carried by the reels through a usual transport mechanism 156. The reel 154, for example, is driven intermittently and it serves as the take-up reel for the film display mechanism 104. The film 19 is drawn through the film transport 156 in an intermittent manner by the take-up reel 154. The intermittent motion of the film through the film transport is such that each matrix 21 recorded on the film is held in the film transport for an interval sufficient to enable it to be scanned by the flying spot beam from the flying spot scanner 100.

As illustrated in FIGURE 10, the flying spot scanner 100 is mounted in the cabinet 150 in a position such that its screen is directly under the film transport 156, so that light from the screen may be directed through the portion of the film 19 arrested in the film transport. The photo-multiplier tube 102 is supported by the cabinet 150 to be directly over the transport 156, and so that light from the screen of the tube 100 passing through the transport, and through the particular film matrix positioned in the transport, may impinge on the sensitive photo cathode element of the photo-multiplier tube 102.

The flying spot scanner 100 may comprise, for example, an electromagnetically deflected cathode ray tube with a viewing screen having short persistence characteristics. The cathode ray beam in the tube is scanned across the screen in usual manner to provide a conventional television type of raster with the retrace lines blanked out. The light from the flying spot which traces out this raster is focused on the particular recorded film matrix 21 arrested in the film transport 156. This is achieved by a suitable reducing lens 157 which is disposed in the optical path between the screen of the flying spot scanner and the film transport.

The light passing through the particular data field, or matrix, 21 during the flying spot scanning process is collected by a collector lens 159 and projected onto the photo cathode surface of the photo-multiplier tube 102. Therefore, light of varying intensity from the film is translated into signal voltages of varying amplitude by the tube 102. The developed signal voltages are amplified and fed into the decoding apparatus 106 which is mounted in the right hand portion of the cabinet 150 of FIGURE 10.

The optical system of the flying spot scanner 100 is shown in somewhat schematic form in FIGURES 11A and FIGURE 11B. As illustrated in FIGURE 11B, for example, the flying spot scanner 100 includes a viewing screen 101. This viewing screen, as mentioned above, has short persistence characteristics. The cathode ray beam in the flying spot scanner is deflected back and forth across the screen 101 in a manner to trace out a plurality of parallel "lines" which are essentially horizontal. The tracing of these lines continues in a recurrent manner from the top of a rectangular area 103 on the screen 101, to the bottom of that area to form successive "fields." The lowermost line completes each field, and the cathode ray beam is returned to the top of the area so that the lines of the next field can be traced out. Each scanning field is timed to coincide with a corresponding recorded data field dot matrix 21 arrested in the film transport 156. Therefore, the cathode ray beam in the flying spot scanner is controlled to trace out successive fields on the screen 101, with the successive fields being controlled to coincide with successive film data fields arrested in the film transport 156. As shown, for example, in FIGURE 11A, the light from the screen of the flying spot scanner 100 is directed to the reducing lens 157 to be focused on the portion of the film strip 19 arrested in the film transport 156. In the manner described, therefore, each field of data 21 recorded on the film strip 19 is scanned by the flying spot scanner.

To assure that registration will be achieved between the projected raster of the flying spot scanner and the particular recorded dot matrix data field 21 in the film transport 156 which is being scanned, the projected raster is made to overlap the recorded data field, as shown in FIGURE 12. This overlapping of the projected raster in both the horizontal and vertical directions with respect to the recorded data fields obviates any problems of registration inaccuracies.

The configuration of each dot matrix data field 21 on the film, as mentioned above, is, for example, a 6 by 15 array with the clock channel running in a "15" direction which may be vertical with respect to the raster field, as shown in FIGURE 12. The flying spot scanner is controlled to have a sufficient number of scanning lines (for example, approximately 100) so that each of the 15 rows in the data field is swept by at least two scanning lines. This is to take care of any slight skewing of the data field on the film with respect to the projected flying spot raster, and also to assure that the second scanning line to impinge on any particular dot row in the field is more nearly in the center portion of the row. As also shown in FIGURE 12, the line scanning of the flying spot scanner is skewed slightly. This is to assure that the first bit intercepted in any row, by a field of sweeping lines progressing from the top to the bottom of the data field, will be a clock bit.

The signal from the first clock bit of each row intercepted by the scanning lines, as that particular row is scanned by the flying spot scanning process, is fed to a flip-flop column counter. During the next scanning line, the column counter is started along with the information read-out. During this second scan of that particular row, as shown by the center scanning line in FIGURE 12, the system is in a preferred scanning position. That is, the scanning beam is now in the center of the particular data row being scanned at that particular moment, such as the illustrated top data row in FIGURE 12.

It will be understood, that the illustrated scanning lines in FIGURE 12 proceed in a recurrent manner from their illustrated positions across the top row down to the bottom row of the data field 21, and that the scanning process repeats for the next data field brought into place in the film transport 156. As noted previously, the retrace lines are blanked out so as to preclude any erroneous readings due to such retrace lines.

The flip-flop column counter keeps track of each column of dots in a data field during the scanning of a particular data row in that field. A second flip-flop counter is caused to count each time a new row is encountered during the scanning process, and this latter counter will be referred to as the "row" counter. Therefore, the column and row counters, as will be described in detail, identify at any particular moment the bit of information being read from the particular data matrix 21 which is then being scanned by the flying spot scanner 100.

As each new row of the dot matrix data field 21 is scanned by the flying spot scanner, a ringing oscillator is activated, as will be described in conjunction with FIGURE 13. The presence or absence of a mark on the film at each bit position in that row is clock gated by the output of that oscillator and is used to indicate a binary "1" or a binary "0" in a particular location. The column and row counters gate the film data matrix information into the correct flip-flops of an interim flip-flop storage register for storage.

A decoding diode matrix is included in the decoding apparatus 106, and the interim flip-flop storage register is used to feed the information into that matrix. The matrix feeds information to delay circuits which supply the printer 108 (FIGURE 10) with its input signals. This printer, as mentioned above, may be a usual Flexowriter. The Flexowriter prints out the character stored in the interim flip-flop register.

The read-out logic components are shown in the systems of FIGURES 13 and 18, and the scanning control system for the flying spot scanner 100 is shown in FIGURE 17.

The logic system shown in FIGURE 13 responds to the scanning of the recorded film clock marks to produce a group of clock pulses in correspondence with the scanning of each data row in the recorded field 21. The system of FIGURE 13 also produces row and column counting signals.

In the system of FIGURE 13, the photo-multiplier tube 102 is connected to an amplifier A100. The amplifier, in turn, is coupled to a Schmidt trigger ST100. The Schmidt trigger ST100 is connected to an "and" gate G125, and the "and" gate has an output terminal connected to the input terminal of a flip-flop included in a "preferred line" counter 200.

At this point, it is appropriate to point out that the various components shown in block form in FIGURE 13 are well known to the art, and a detailed circuit explanation of these components is believed to be unnecessary. For example, the Schmidt trigger may be a relaxation oscillator which responds to a signal input to produce corresponding square wave output. Similarly, "and" gates are usually composed of diode or transistor networks, and these gates are constructed to have a plurality of input terminals, and to be conditioned for translation only when the signals introduced to all the different input terminals are true.

The flip-flop is a bi-stable multivibrator circuit. This circuit responds to a succession of input signals applied to common input terminal to be triggered successively between its true and false states, or to respond to different input signals which trigger it to its false state and to its true state respectively.

Reference will also be made to monostable multivibrators in the subsequent discussion. These multivibrators are also referred to as "one-shot" multivibrators and they are usually used for delay purposes. The monostable multivibrator has a stable state and an unstable state. An input pulse triggers the multivibrator from its stable state to its unstable state, and it returns to its stable state after a particular interval is established by the parameters of the multivibrator.

A "preferred line" counter, as will be described in conjunction with FIGURE 14, may be a binary counter and it has a "0" state, a "1" state, and a "2" state. The counter may be triggered from the "0" stage to the "1" stage, and it may then be triggered to the "2" state. The counter may then be reset to the "0" state after such triggering by an appropriate reset pulse, as will be described.

When the counter 200 is in its "1" state, it introduces a pulse to a monostable multivibrator DF100. The multivibrator DF100 is connected to a delay line 202 which, in turn, is connected to the "and" gate G125. The delay line 202 delays the output signal from the multivibrator by approximately one-half a system clock.

When the preferred line counter 200 is in its "2" state, it introduces a signal to a flip-flop FF101. The true output terminal of the flip-flop FF101 is connected to a ringing oscillator 204. This ringing oscillator may have any known composition. Whenever an input pulse is introduced to it from the flip-flop FF101, it oscillates at a particular frequency. The resulting sine wave output from the ringing oscillator 204 is introduced to a Schmidt trigger ST101. The Schmidt trigger ST101 produces the system clock pulses which are applied by way of an output terminal 205 to the system of FIGURE 18 for gating purposes, as will be described.

The output terminal of the Schmidt trigger ST101 is connected to a column counter 206. Successive triggerings of the Schmidt trigger ST101 cause the column counter 206 to step from one configuration to another. This stepping of the column counter produces successive output signals at its output terminals 1–6. The details of the column counter 206 are shown in FIGURE 15. The No. 6 output terminal of the counter 206 is connected to a reset line 208. This reset line connects with the flip-flop FF101 and with the preferred line counter 200. The reset line 208 also is connected to a monostable multivibrator DF101 and to a row counter 212. The monostable multivibrator has its output terminal connected to a delay line 210 and to the column counter 206. The latter connection causes the monostable multivibrator DF101 to introduce a reset pulse to the column counter. The delay line 210 introduces a delay of approximately one-half a clock period to the output signal from the monostable multivibrator DF101. The output terminal of the delay line is connected to the "and" gate G125. The true output terminal of the flip-flop FF101 is also connected to that "and" gate.

The row counter 212 has 15 output terminals which are numbered 0–14 and it is triggered to 15 different configurations by a signal derived from column counter 206. The row counter is reset by the vertical retrace blanking pulse derived, as will be explained, in the system of FIGURE 17.

The first piece of information entered into the system of FIGURE 13, as each new row of the recorded data field in FIGURE 12 is scanned by the flying spot scanner, is always a film clock pulse, for the reasons described above. This clock pulse is amplified by the amplifier A100, and it is shaped into a square waveform by the Schmidt trigger ST100.

At this time, all the inputs to the "and" gate G125 are true, and the "and" gate is conditioned for conduction. The amplified film clock pulse is, therefore, used to put the preferred line counter 200 into its "1" state. The resulting output from the preferred line counter triggers the monostable multivibrator DF100, and the resulting output signal from the multivibrator, delayed slightly by the delay line 202, inhibits the "and" gate 125.

The monostable multivibrator DF100 remains in its unstable state for a period longer than 6 clock pulses, so that the remaining pulses read from the scanned row do not pass through the "and" gate G125. The second time that the particular row is scanned, the "and" gate G125 is again conductive because the monostable multivibrator DF100 has returned to its stable state. The "and" gate G125 therefore passes the clock pulses for the second scanning of that row, and this clock pulse sets the preferred line counter 200 to its "2" state. The preferred line counter in its "2" state triggers the flip-flop FF101 true, and this causes the ringing oscillator 204 to be activated. The resulting sinusoidal output signal from the ringing oscillator is squared by the Schmidt trigger ST101, and the resulting output pulses from the Schmidt trigger constitute, as mentioned above, the clock pulses of the system.

The clock pulses from the Schmidt trigger ST101 trigger the column counter 206. The output of the flip-flop FF101 is also introduced to the "and" gate G125, as mentioned above, to inhibit that gate, so that, again, only the film clock pulse reaches the flip-flop FF100.

After the column counter 206 has counted 6, it introduces a signal to the reset line 208 which resets the preferred line counter 200 to its "0" state. The column counter 206 also resets the flip-flop FF101, and it triggers the monostable multivibrator DF101 to its unstable state. The monostable multivibrator DF101 remains in its unstable state for a period longer than 24 system clock pulses. This inhibits the "and" gate G125 for any additional sweeps which may cross the row which has just been read. The column counter is reset from the trailing edge of the output pulse from the monostable multivibrator DF101, as that multivibrator returns to its stable state.

Each time the column counter 206 reaches a 6 count, it causes the row counter 212 to be stepped from one configuration to another for each 6 count of the column counter 206. The latter counter is reset by the vertical retrace pulse, as noted above, which is derived from the scanning system (FIGURE 17) associated with the flying spot scanner. This resetting of the row counter 212 occurs at the end of the scanning process of each dot matrix data field 21 on the film, and when the flying spot scanner is being conditioned to initiate the scanning of the next data field.

The system of FIGURE 13, therefore, generates a series of system clock pulses at the output terminal 205 as each row of the data field in FIGURE 12 is being scanned. These clock pulses are used, as will be described, to gate the information read from each row of each dot matrix data field on the film, so that appropriate output signals may be derived by the system of FIGURE 18 to actuate the printer 108 (FIGURE 9). The system of FIGURE 13 also provides an indication at the output terminals of the row counter 212 as to which row of the data field is being scanned at any particular time, and it provides indications at the output terminals of the column counter 206 as to which bit position in the particular row is being scanned at any particular instant.

As mentioned above, the preferred line counter 200 of FIGURE 13 is shown in some detail in FIGURE 14. This counter includes a pair of flip-flops A and B, and these flip-flops are connected in usual binary counter manner. The output from the "and" gate G125 of FIGURE 13 is introduced to the flip-flop A in such a manner that successive pulses from the "and" gate successively trigger the flip-flop between its true and false states. The true output terminal A of the flip-flop A is coupled to the flip-flop B and to an "and" gate G124. The connection between the flip-flop A and the flip-flop B is a usual binary counter coupling by which the flip-flop A triggers the flip-flop B between its true and false states for successive triggerings of the flip-flop A to its false state.

The false output terminal $\bar{A}$ and the true output terminal B of the respective flip-flops A and B are connected to an "and" gate G123. The false output terminal $\bar{B}$ of the flip-flop B is connected to the "and" gate G124. The "and" gate G123 is connected to the flip-flop FF101 of FIGURE 13. The "and" gate G124 is connected to the monostable multivibrator DF100 of FIGURE 13. The reset line 208 is connected to the false input terminal $\bar{a}$ of the flip-flop A and to the false input terminal $\bar{b}$ of the flip-flop B.

A pulse on the reset line 208 sets both the flip-flops A and B to the false state. Then, the first output signal from the "and" gate G125 triggers the flip-flop A true. This causes the "and" gate G124 to pass a signal to the monostable multivibrator DF100 to trigger that multivibrator. This condition corresponds to step 1 of the preferred line counter 200, as described above. This step is represented by the condition $A.\bar{B}$ of the flip-flops in the counter. The next output signal from the "and" gate G125 triggers the flip-flop A false and this causes the flip-flop B to be triggered true. The "and" gate G123 now becomes conductive to trigger the flip-flop FF101 to its true state. The latter condition corresponds to step 2 of the preferred line counter, as described above. This latter step is represented by the configuration $\bar{A}.B$ of the flip-flops. The next reset pulse on the line 208 resets the counter to the $\bar{A}.\bar{B}$, or step 0, state, The column counter 206 is shown in some detail in FIGURE 15. The counter includes a group of three flip-flops G, H and J. The flip-flop G is coupled to the flip-flop H, and the flip-flop H is coupled to the flip-flop J in usual binary counter manner. This intercoupling is such that whenever the flip-flop G is set false, it triggers the flip-flop H from one state to another. Likewise, whenever the flip-flop H is set false, it triggers the flip-flop J from one state to an other. The reset pulse from the monostable multivibrator DF101 of FIGURE 13 is introduced to the false input terminals $\bar{g}$, $\bar{h}$ and $\bar{j}$ of the three flip-flops. The counter is, therefore, set to the $\bar{G}.\bar{H}.\bar{J}$ configuration by the reset pulse. The input pulses from the Schmidt trigger ST101 in FIGURE 13 are introduced to the flip-flop G. Successive ones of these pulses trigger the flip-flop G between its true and false states. The output terminals of the three flip-flops are connected to a matrix 250, and the matrix has output terminals number 106, and which correspond to the output terminals of the counter 206, as illustrated in FIGURE 13.

As the flip-flop G is successively triggered by pulses from the Schmidt trigger ST101, the counter 206 moves from its reset $\bar{G}.\bar{H}.\bar{J}$ configuration to assume successively the following configurations:

G $\bar{H}$ $\bar{J}$      $\bar{G}$ H J
$\bar{G}$ H $\bar{J}$      G $\bar{H}$ J
G H $\bar{J}$      $\bar{G}$ H J The matrix 250 may be a usual diode matrix which responds to the different configurations of the flip-flops G, H and J to provide an output at a different one of the output terminals 106 in response to each different configuration.

The row counter 212 is shown in some detail in FIGURE 16. This counter includes a group of four flip-flops C, D, E and F. The reset pulse from the vertical retrace system of FIGURE 17 is introduced to the false input terminals $\bar{c}$, $\bar{d}$, $\bar{e}$ and $\bar{f}$ of the flip-flops. The output from the No. 6 terminal of the column counter 206 is introduced to the flip-flop C. As before, successive output pulses from that terminal cause the flip-flop C to be triggered between its two stable states. The output terminals of the four flip-flops C, D, E and F are connected to a matrix 252. The output terminals of the matrix are numbered 0–14, in correspondence with the output terminals of the row counter 212 in FIGURE 13.

When the flip-flops C, D, E and F are reset, the counter assumes the $\bar{C}.\bar{D}.\bar{E}.\bar{F}$ configuration. Successive pulses from the No. 6 terminal on the counter 206 then cause the row counter 212 successively to assume the following configurations:

C $\bar{D}$ $\bar{E}$ $\bar{F}$      C $\bar{D}$ $\bar{E}$ F
$\bar{C}$ D $\bar{E}$ F      $\bar{C}$ D $\bar{E}$ F
C D $\bar{E}$ $\bar{F}$      C D $\bar{E}$ F
$\bar{C}$ $\bar{D}$ E $\bar{F}$      $\bar{C}$ $\bar{D}$ E F
C $\bar{D}$ E $\bar{F}$      C $\bar{D}$ E F
$\bar{C}$ D E $\bar{F}$      $\bar{C}$ D E F
C D E $\bar{F}$      C D E F
$\bar{C}$ $\bar{D}$ $\bar{E}$ F An appropriate scanning system for the flying spot scanner 100 is shown in schematic block form in FIGURE 17. Flying spot scanners and their associated scanning systems are well known to the art. For that reason, a detailed explanation of the system will not be included here. As is well known, the flying spot scanner itself is a usual cathode ray tube having a fluorescent screen with a short persistence characteristic. The cathode ray beam is scanned usually across the screen in a plurality of lines which form a succession of fields. As each line is scanned, the resulting light produced at the fluorescent screen may be focused on a remote object, such as the film strip of the system of this invention, so that the remote object may be effectively scanned by the cathode ray beam.

A usual 60 cycle alternating current power line is connected to appropriate squarer and differentiator networks represented by the block 260. These networks are connected to a 60 c.p.s. blocking oscillator 262. This blocking oscillator, in turn, is connected to a sweep signal generator 264. The blocking oscillator 262 generates pulses at the field repetition frequency, and the sweep generator 264 produces sweep output signals at the field frequency. The sweep output signals from the signal generator 264 are introduced across the field deflection coils of the flying spot scanner 100.

The vertical sweep generator 264 is also coupled to a monostable multivibrator 266. The monostable multivibrator 266 is controlled by the signal generator 264 and it controls a blocking oscillator 268. The blocking oscillator 268 is self-oscillating at the line frequency, and it is coupled to a line sweep signal generator 270. The latter generator produces the line or horizontal sweep signal in the horizontal deflection coils of the flying spot scanner 100, to which the generator 270 is coupled.

The vertical blocking oscillator also produces vertical retrace blanking pulses which are applied to the electronic gun of the flying spot scanner 100. These pulses serve to blank out the vertical retrace lines on the raster formed on the viewing screen of the flying spot scanner. In like manner, the horizontal retrace lines are blanked out by the introduction of horizontal blanking pulses to the electron gun from the horizontal blocking oscillator 268. The vertical retrace pulses from the oscillator 262 are also applied to the row counter 212 of FIGURE 13 to reset that counter at the end of each field, as described above.

The basic field repetition rate is set, for example, by the 60 cycle line. The sine wave of this frequency derived from that line is squared and differentiated in the block 260. The positive pulses from this differentiation are used to trigger the vertical blocking oscillator 262. The period of this blocking oscillator may, for example, be 16.7 milliseconds, and the width of the blocking oscillator pulse may be approximately 1.6 milliseconds. The pulse from the vertical blocking oscillator 262 provides blanking during vertical retrace; it provides the vertical drive to the flying spot scanner by way of the sweep signal generator 264; it resets the row counter 212; and it sets the monostable multivibrator 266 which activates the horizontal blocking oscillator 268. The period of the horizontal blocking oscillator may be approximately 170 microseconds, and its pulse width may be approximately 25 microseconds. The horizontal pulses from the blocking oscillator 268 accomplish two things. That is, these pulses provide horizontal drive for the flying spot scanner by way of the horizontal sweep signal generator 270, and they also provide blanking for the flying spot scanner during horizontal retrace. The amplitude of the blanking horizontal and vertical pulses may be approximately 10 volts, for example. As a result of the sweep rate and the overlap of the data field, the internal system clock rate may be approximately 50 kilocycles.

The system of FIGURE 13, as described above, responds to the output from the photo-multiplier tube 102 to select the clock pulse from each row of digital pulses, and to generate system clock pulses in response to that clock pulse. The photo-multiplier pick-up tube 102 is also coupled to the system of FIGURE 18, and this system responds to the clock pulses from the system of FIGURE 13 to pass information pulses to the Flexowriter 103 for a selected scan of each row of markings in the digital data field. As mentioned above, this selected scan may, for example, be the second scan after the detection of a clock pulse in a particular row, the second scan assuring that the flying spot scanner will actually scan each digital marking in the particular row.

The photo-multiplier pick-up tube 102 is connected to an amplifier 300 in FIGURE 18 which, in turn, is connected to an interim flip-flop storage register 302. The storage register 302 connects with a suitable decoding matrix 304, and the matrix is connected to the Flexowriter, or equivalent output device 103. The interim flip-flop storage register 302 responds to system clock pulses received from the terminal 205 of FIGURE 13. This assures that the information read into the register 302 will correspond only to the selected scan of each row which, as noted above, is the second scan in the illustrated embodiment of the invention.

The interim flip-flop storage register 302 also responds to signals from the column counter 206 of FIGURE 13 so that the digital pulses derived from the scanned row of digital markings may be stored in respective flip-flops in the register. The register is reset by a reset pulse derived from the monostable multivibrator DF101 of FIGURE 13 at the completion of scan of each row, and just before the next row is to be scanned. This reset pulse is received at the same time that the monostable multivibrator DF101 applies the reset pulse to the column counter 206.

During the second scan of a particular row of markings in the data field by the flying spot scanner 100, the system of FIGURE 13 generates a series of clock pulses, and these clock pulses are introduced to the interim flip-flop storage register 302 of FIGURE 18. Then, as the flying spot beam scans each successive digital marking, the resulting pulses are amplified by the amplifier 300. The outputs from the column counter 206 of FIGURE 13 are introduced to the register 302 so that the flip-flops in the register may be successively set to "1" or "0" depending upon whether the flying spot beam encounters a marking or no marking at the successive digit positions.

In the above described manner, a row of information from the photo-multiplier pick-up tube 102 is read into the storage register 302 in serial form. The resulting flip-flop configuration in the storage register causes the decoding matrix 304 to produce output signals at different ones of a plurality of output terminals. These output terminals are connected to the Flexowriter 108. Each of the different relay configurations in the register 302 produces an output at a different one of the output terminals of the decoding matrix 304. Each of these different output terminals causes the Flexowriter to print a different figure, number or character on its recording medium. These characters are controlled, for example, in accordance with the table illustrated in FIGURE 20.

As shown in FIGURE 19, the interim flip-flop storage register 302 includes a group of six flip-flops, and these flip-flops are numbered 401–406. The true input terminals of these flip-flops are connected respectively to a plurality of "and" gates 410, 412, 414, 416, 418 and 420. The output signal from the amplifier 300 is introduced to each of the "and" gates, and output terminals 1–6 of the column counter 206 of FIGURE 13 are respectively connected to the "and" gates. Also, the clock pulses from the terminal 205 of FIGURE 13 are introduced to each of the "and" gates. The reset pulse from the monostable multivibrator DF101 of FIGURE 13 is introduced to the false input terminal of each of the flip-flops. Therefore, the interim flip-flop storage register is reset to the $\overline{401}.\overline{402}.\overline{403}.\overline{404}.\overline{405}.\overline{406}$ by the reset pulse. Then, during the second scan of the next row of digital markings, the clock pulses appear at the terminal 205 of FIGURE 13. Concurrently with these clock pulses, the column counter 206 produces an output signal at successive ones of its output terminals.

Therefore, during the second scan referred to above, the "and" gates 410, 412, 414, 416, 418 and 420 are successively conditioned for conduction. Then, whenever a pulse is received from the photo-multiplier tube amplifier 300, indicating the interception of a binary "1" digital marking by the scanning beam of the flying spot scanner 100, the corresponding flip-flop in the interim storage register 302 is set true. At the completion of the scanning of the particular row, the digital information represented by that row is transferred to the storage register 302. The resulting configuration of the flip-flops determines which output terminal of the decoding matrix 304 an output signal is to appear. This, in turn, determines which character is to be printed by the Flexowriter 108.

The invention provides, therefore, an improved digital recording system whereby digital data may be recorded on a medium in correlation with corresponding pictorial information. The present invention provides more particularly an improved system for recording the digital data on the film record, and for subsequently reading the data from the film.

In accordance with the invention, and as described above, the digital information may be accurately read from the film, despite slight skewing and misalignments of the film. This latter feature is realized, for example, by causing the scanning field to overlap each of the data fields on the fiilm strip, and for providing an improved and unique means for detecting the different rows of digital information in the data fields.

The invention is also advantageous in that the recording and reading system is relatively simple to construct, and is yet capable of providing precise and accurate indications of the required digital data.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A system for reading digital information recorded on a recording medium in at least one data field, the data field including a plurality of series of digital markings with at least one marking in each series representing a clock marking, said system including: scanning means disposed in coupled relationship with the recording medium for sequentially scanning successive series of digital markings in the data field and for sequentially scanning the digital markings in each successive field, transducer means disposed in coupled relationship with the scanning means during the sequential scanning of said series of digital markings and responsive to such scanning to produce a series of electrical signals representing the markings in each of the series, utilizing means responsive to the electrical signals passing to the utilization means from the transducer means for providing an indication of the information recorded in the respective series of digital markings scanned by the scanning means, a storage register coupled to the transducer means and to the utilizing means and operative upon being enabled to receive the electrical signals from the transducer means and to subsequently introduce the same to the utilizing means, control means coupled to the transducer means for producing a series of clock pulses in correspondence with the digital markings in each particular series being scanned and in response to the scanning of the clock marking in the particular series by the scanning means, and means coupled to the control means and to the storage register and responsive to the clock pulses from the control means for enabling the storage register to receive the digital signals corresponding only to the particular series.

2. The combination defined in claim 1 and in which the control means includes circuitry including an oscillator for producing the series of clock pulses at a particular repetition frequency when the oscillator is activated, switching means coupled to the transducer means and to the oscillator for activating the oscillator in response to the scanning of the clock marking by the scanning means, and means coupled to the oscillator and to the switching means for causing the switching means to deactivate the oscillator after a predetermined interval corresponding to the interval required by the scanning means to scan the corresponding series of digital markings.

3. A system for reading digital information recorded on a recording medium in at least one data field, the data field including a plurality of series of digital markings with at least one marking in each series representing a clock marking, the system including: scanning means disposed in coupled relationship with the recording medium for sequentially scanning successive series of digital markings in the data field and the digital markings in each successive series a plurality of times, transducer means disposed in coupled relationship with the scanning means during the sequential scanning of each particular series of digital markings and in response to such scannings to produce series of electrical signals representing the digital markings in each of the series, utilizing means responsive to the electrical signals from the transducer means for providing an indication of the information recorded in the respective series of digital markings scanned by the scanning means, electrical circuit means coupled to the transducer means and to the utilizing means and operative upon becoming activated to pass the electrical signals from the transducer means to the utilizing means, control means for producing a series of clock pulses at a particular repetition frequency, means including a counter coupled to the transducer means and to the control means for applying an activating signal to the control means in response to the scanning of the clock markings in the successive series and after a particular number of scans in each series, and means coupled to the control means and to the electrical circuit means and responsive to the clock pulses from the control means for enabling the electrical circuit means to pass the electrical signals from the transducer means to the utilization means.

References Cited by the Examiner

UNITED STATES PATENTS

| | | | |
|---|---|---|---|
| 2,426,947 | 9/47 | Potts | 346—107 |
| 2,714,841 | 8/55 | Demer et al. | 340—173 |
| 2,736,630 | 2/56 | Cooper | 346—107 |
| 2,843,841 | 7/58 | King et al. | 340—173 |
| 2,899,673 | 8/59 | Reiner | 340—173 |
| 2,907,985 | 10/59 | Doersam et al. | 340—173 |
| 2,922,987 | 1/60 | Haugk | 340—173 |

IRVING L. SRAGOW, *Primary Examiner.*

JOHN T. BURNS, *Examiner.*